United States Patent [19]
Gibney

[11] 3,770,357
[45] Nov. 6, 1973

[54] EXTRUSION DIE
[75] Inventor: Lloyd W. Gibney, Funkstown, Md.
[73] Assignee: American Optical Corporation, Southbridge, Mass.
[22] Filed: Nov. 15, 1971
[21] Appl. No.: 199,066

Related U.S. Application Data
[63] Continuation of Ser. No. 847,573, Aug. 5, 1969, abandoned.

[52] U.S. Cl. .............................................. 425/131
[51] Int. Cl. ............................................... B29f 3/12
[58] Field of Search ..................... 425/130, 131, 133

[56] References Cited
UNITED STATES PATENTS
| | | | |
|---|---|---|---|
| 3,443,278 | 5/1969 | Nauta | 425/131 |
| 3,531,828 | 10/1970 | Nauta | 425/131 |
| 3,321,804 | 5/1967 | Breidt, Jr. et al. | 425/131 |
| 3,415,920 | 12/1968 | Lee et al. | 425/133 X |
| 3,420,267 | 1/1969 | Veazey | 425/131 X |
| 3,406,427 | 10/1968 | Tsuji | 425/131 |
| 3,546,739 | 12/1970 | Callahan et al. | 425/131 |

Primary Examiner—Robert L. Spicer, Jr.
Attorney—William C. Nealon et al.

[57] ABSTRACT

A die for extruding varigated plastic sheet stock. The die is a multiple extrusion die having a main die structure which receives a supply of plastic material of one color and emits the varigated extrusion while a second die enclosed within the main die structure receives a plastic material of a second color along with the material of said one color and extrudes the two materials in the form of a multiplicity of alternate juxtapositioned strips into an extrusion orifice of the main die structure. Compression of the inner die extrudate taking place between die lips of the main structure blends the differently colored plastic materials together with retention of the general configuration of pattern produced by the inner die.

6 Claims, 6 Drawing Figures

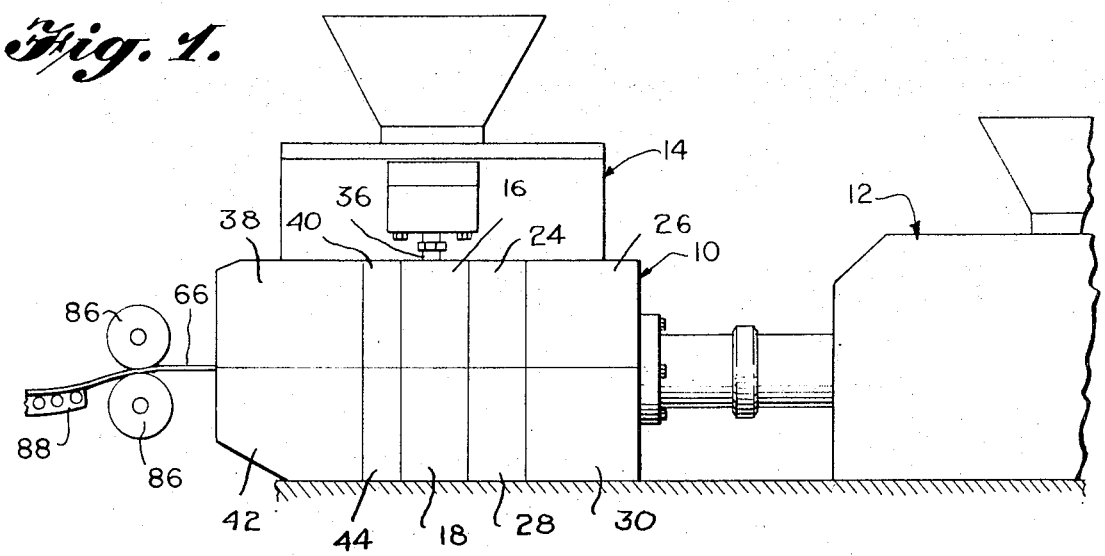
Fig. 1.
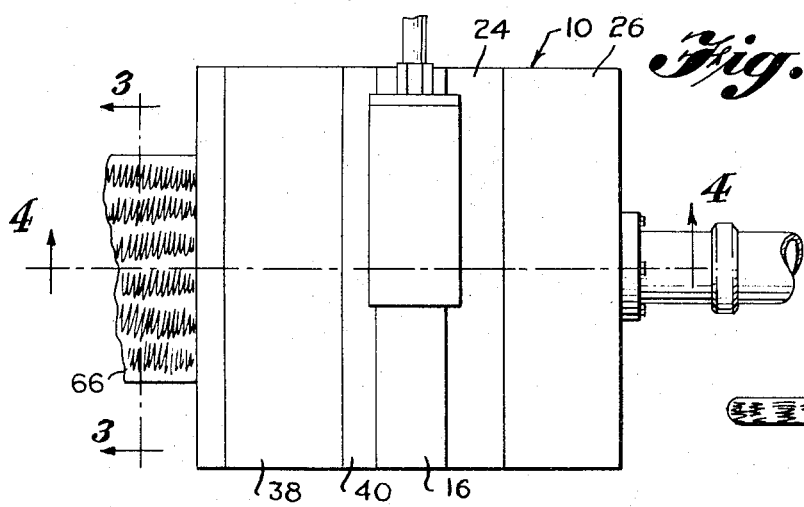
Fig. 2.
Fig. 3.
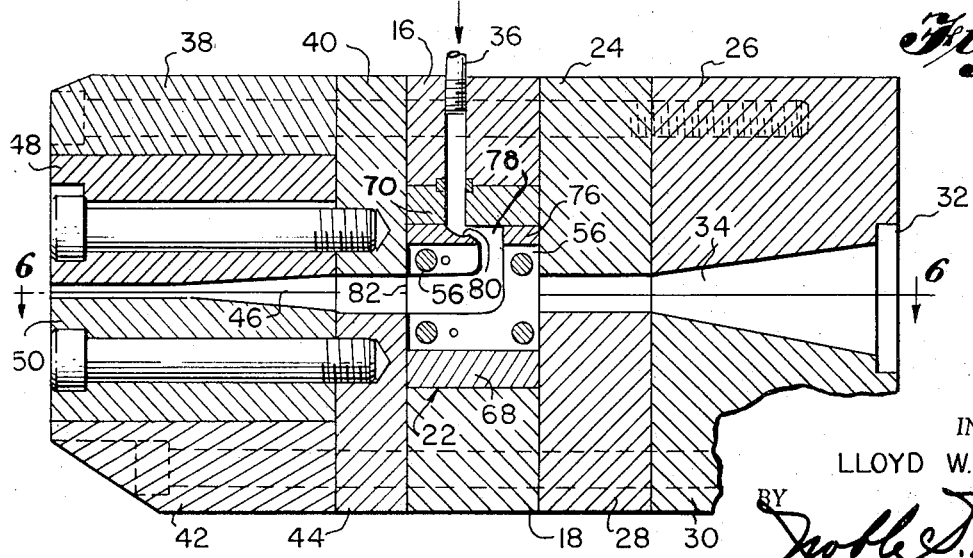
Fig. 4.
INVENTOR.
LLOYD W. GIBNEY
ATTORNEY

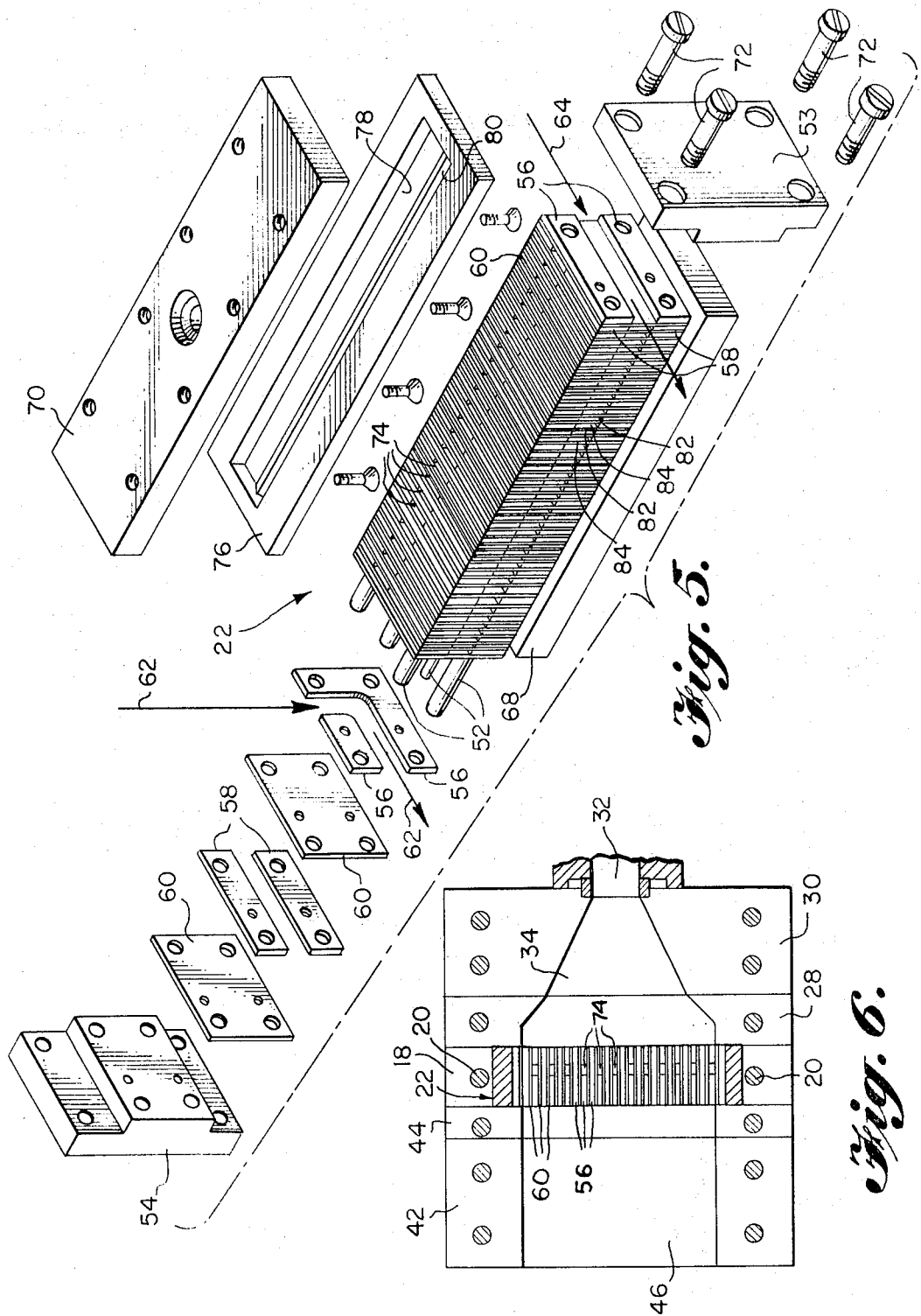

EXTRUSION DIE

This is a continuation, of U.S. Pat. application Ser. No. 847,573, filed Aug. 5, 1969, now abandoned.

BACKGROUND OF THE INVENTION

Field Of The Invention

Extrusion dies particularly of the type used to produce varigated plastic extrusions.

Description Of The Prior Art

Heretofore in the art of extruding varigated plastic sheet materials, the industry has been seriously limited by difficulties in overcoming linear laminar effects, blotchy appearances and harsh patterns. Harshly patterned sheet stock, in not being particularly pleasing in appearance, accordingly has had only limited usefulness. Manufacturers of high quality eyeware, for example, require a plastic sheet stock in which colors and pattern are smoothly blended throughout the thickness of the stock in configurations which are readily reproducible for standarization of color and pattern.

The inability to readily extrude smoothly blended varigated plastic sheet stock has, heretofore, forced spectacle frame manufacturers and others to turn to suppliers of block-formed sheet stock for quality color blending and reliable duplication of pattern.

Block-formed plastics are extremely costly in that their manufacture requires long, tedious and skillfully handled operations including the extrusion of long and thin strips of differently colored monochromatic plastics, individual skillful handling and arranging of such strips in particular side-by-side relationships with each other according to the design desired in the sheet stock, long hours of heating the assemblies for fusing and blending of all strips and careful transverse cutting of the fuse block into sheets. Accordingly, spectacle frame manufacturers and others requiring such stock are burdened with high material costs and limited supplies mainly as a result of the long and tedious operations.

The present invention overcomes problems relating to supply and more particularly to the high cost of quality smoothly blended varigated plastic sheet stock by making it possible to form such stock by extrusion.

SUMMARY OF THE INVENTION

Varigated plastic sheet stock having smoothly blended inlays of preselected color and reproducible pattern is produced according to principles of the present invention through the provision of a multiple extrusion die. This die comprises a main die structure having an internal second extrusion die which, in turn, is made up of a multiplicity of miniature extrusion dies. Plastic material of one preselected color is introduced into an entrance port in tha main die structure and received by miniature dies of the internal second die along with another supply of differently colored plastic material which is simultaneously introduced into the second die. In passing through the minature extrusion dies of the second or inner die, the two differently colored plastic materials are formed into alternately juxtapositioned ribbons and caused, as a composite extrudate from the second die, to enter and pass through the extrusion orifice of the main die structure. In passing through the main extrusion orifice, the inner die extrudate is compressed to the final thickness and shape desired of the plastic sheet stock. This compression of the inner die extrudate effect a blending of the differently colored plastic materials with retention of the general configuration of color-pattern produced by the inner die.

The inner die consists basically of a series of thin barrier and separater plates wherein a differently colored plastic material is received between alternate sets of barrier plates in the series and emitted in strip form. All such strips are fused together and compressed in the main extrusion orifice to form the final smoothly blended varigated sheet stock extrusion. The shapes and sizes of barrier plates, being determinative of the shapes and sizes of plastic strips or ribbons formed thereby, control the general configuration of color-pattern produced in the final extrusion. They are selected as to size, shape and position relative to each other in the inner die according to the type of color-pattern desired to be produced.

Details of the present invention will become more fully understood by reference to the following description and the accompanying drawing.

DESCRIPTION OF THE DRAWING

FIG. 1 is a fragmentary side elevational view of an embodiment of the invention:

FIG. 2 is a plan view of the embodiment of the invention shown in FIG. 1;

FIG. 3 is an enlarged fragmentary cross-sectional view taken along line 3—3 of FIG. 2;

FIG. 4 is an enlarged vertical cross-sectional view taken generally along line 4—4 of FIG. 2;

FIG. 5 is an illustration, in perspective, of an internal extrusion die component of the illustrated embodiment of this invention wherein certain parts of the die component are shown in disassembled relationship with each other; and FIG. 6 is a horizontal cross-sectional view of the whole die structure taken along line 6—6 of FIG. 4.

DESCRIPTION OF THE PREFERRED EMBODIMENTS

When in use, multiple extrusion die 10 is coupled to extruders 12 and 14 in such a manner as to receive a heated plastic material from each extruder. One extruder supplies material of one color and the other extruder supplies material of a different color.

Extruders 12 and 14 which may be of any suitable conventional design or type are not considered as being a part of the present invention. They are shown only for the purpose of illustrating the function of die 10 in an extrusion system.

Referring more particularly to details of die 10, it will be seen in FIGS. 4, 5, and 6 that the main body structure of die 10 comprises a number of die blocks all securely fastened together so as to form an internal cavity. The assembly of die blocks is made with removeable threaded studs so that the die can be disassembled for cleaning.

Intermediate upper and lower die blocks 16 and 18 respectively are connected together with studs 20 (see FIG. 6) and receive therebetween supplementary die 22. At one side of supplementary die 22, upper die blocks 24 and 26 mated with lower die blocks 28 and 30 are recessed along their respective mating surfaces to form entrance port 32 and passageway 34 through which a supply of heated plastic material of one color (e.g. from extruder 12) is directed into supplementary die 22. Heated plastic material of a different preselected color (e.g. from extruder 14) is directed into supplementary die 22 through entrance port 36 in die block 16 (see FIG. 4).

Upper die blocks 38 and 40 mated with lower die blocks 42 and 44 are recessed along their respective mating surfaces to form the main extrusion orifice 46 of die 10 which, as it will become more apparent hereinafter, receives an extrudate of both plastic materials from supplementary die 22. Die lips 48 and 50 in extrusion orifice 46 compress this extrudate to the size and shape desired of the finished plastic sheet stock emitted from die 10.

Referring more particularly to FIG. 5, it can be seen that supplementary die 22 is, in itself, made up of a series of miniature extrusion dies which are constructed as follows:

Alignment rods 52 extending between end plates 53 and 54 of supplementary die 22 support a series of alternate sets of barrier plates 56 and 58 with a separator plate 60 disposed between each of said sets. Each set of two barrier plates 56, together with separator plates 60 at each side thereof, form a miniature extrusion die within supplementary die 22 through which plastic material from passageway 34 in die 10 is directed and shaped into the form of a ribbon. In a similar manner, each set of two barrier plates 58, together with its adjoining separator plates, forms a miniature extrusion die through which plastic material from entrance port 36 is extruded in side-by-side relationship with extrusions from barrier plates 58. The flow direction of plastic material between pairs of barrier plates 56 is indicated generally by arrows 62 and the flow direction of plastic material between pairs of barrier plates 58 is indicated generally by arrows 64. Thus, the composite extrudate from supplementary die 22 which is received in extrusion orifice 46 of die 10 is in the form of a multiplicity of juxtapositioned ribbons of alternately different colored plastic materials, all fused together upon entering extrusion orifice 46. It should be understood that the sizes and shapes of barrier plates 56 and 58 may be varied according to the thicknesses and shapes desired of plastic ribbons formed therebetween as determined by the color variations and design configuration desired of the final sheet-like extrusion 66 emitted from die 10.

Base plate 68 and top plate 70, to which end plates 53 and 54 of supplementary die 22 are secured by screws 72, form the main supporting structure of supplementary die 22.

Plastic material entering port 36 of die 10 is supplied under substantially uniform pressure and in equal amounts into each of inlet ports 74 by diverter plate 76 having an elongated opening 78 communicating with all ports 74. Diverter plate 76 is disposed between the series of barrier plates 56, 58 and top plate 70.

Plastic material passing through port 36 is received by baffle 80 which distributes the flow of plastic material laterally along the full length of opening 78.

Extrusion orifices 82 and 84 of supplementary die 22 located between respective sets of barrier plates 56 and 58 direct the composite extrudate of the two differently colored plastic materials into extrusion orifice 46 of die 10. Under the usual pressure applied to materials in extrusion dies, the composite ribbon extrudate is compressed in orifice 46 to a reduced cross-sectional size causing adjoining portions of alternate ribbons of the extrudate to blend with each other whereby a two color pattern of pleasing appearance and controlled repetitive pattern is produced continuously along the length of extrusion 66.

Immediately floowing its emission from die 10, extrusion 66 is cooled to a dimensionally stable condition by cooling rollers 86 (FIG. 1) and is further air-cooled by passage along conveyer 88 whereupon it is cut transversely into lengths which are convenient for storage and handling.

I claim:

1. A multiple die for producing a unitary composite extrusion of varigated plastic material comprising:

a main body structure having an entrance port for receiving a first supply of flowable plastic material of one color, a passageway extending through said main body structure and a main extrusion orifice through which said unitary extrusion is emitted, said entrance port, passageway and extrusion orifice being all coaxially aligned with each other in a direction straight through said main body structure;

a supplementary extrusion die enclosed within said main body structure, said supplementary die having a first plurality of inlet ports along one side thereof all disposed within said passageway of said main body structure for receiving said plastic material of said one color and a second plurality of inlet ports all disposed along a side adjacent to said one side of said supplementary die for receiving a second supply of flowable plastic material of a different color than that of said first supply, said supplementary die further having a succession of juxtapositioned extrusion orifices oppositely of and all aligned with said first plurality of inlet ports, said succession of extrusion orifices all being so disposed as to open into said main extrusion orifice of said main body structure whereby a composite extrudate of said first and second plastic materials, when each is forced under pressure into said multiple die, is extruded into said main extrusion orifice from said succession of extrusion orifices of said supplementary die; and die lips in said main extrusion orifice of a size and shape rendering said orifice smaller than the cross-sectional size of said composite extrudate whereby said composite extrudate is compressed prior to its emission from said main extrusion orifice into said unitary extrusion of varigated plastic material, the latter being emitted from said main extrusion orifice.

2. A multiple extrusion die according to claim 1 wherein said inlet ports and extrusion orifices of said supplementary die are formed between a series of juxtapositioned sets of barrier plates, each set comprising a pair of said plates spaced from one another to form an extrusion channel therebetween and separating plates between said barrier plates functioning to separate said channels from one another.

3. A multiple extrusion die according to claim 2 wherein said inlet ports between alternate sets of said barrier plates extend along one side of said supplementary die, inlet ports between remaining sets of said barrier plates extend along another adjacent side of said supplementary die and extrusion orifices between all of said barrier plates extend along a third side of said supplementary die.

4. A multiple extrusion die according to claim 3 wherein said supplementary die includes a diverter plate for distributing said second supply of plastic material in substantially uniform amounts into each of said inlet ports of said supplementary die.

5. A multiple extrusion die according to claim 3 including means for directing said secondary supply of said plastic material through said main body structure directly into said diverter plate.

6. Apparatus for producing a unitary composite extrusion of varigated plastic material comprising the combination of:

a main extrusion die having an internal cavity, an entrance port for receiving and directing a first supply of flowable plastic material of one color into said cavity and a main extrusion orifice leading from said cavity externally of said apparatus through which said unitary composite extrusion may be emitted said entrance port and extrusion orifice being aligned with each other in a direction straight through said main extrusion die;

a supplementary extrusion die within said cavity of said main extrusion die, said supplementary die having a first plurality of inlet ports within said cavity of said main extrusion die for receiving said plastic material of said one color and a second plurality of inlet ports for receiving a second supply of a flowable plastic material of a different color than that of said first supply, said supplementary die further having a succession of juxtapositioned extrusion orifices respectively alternately communicating with said first and second plurality of inlet ports, said extrusion orifices of said supplementary extrusion die all opening into said main extrusion orifice of said main extrusion die whereby a composite extrudate of said first and second plastic materials may be extruded into said main extrusion orifice.

* * * * *